Patented July 16, 1946

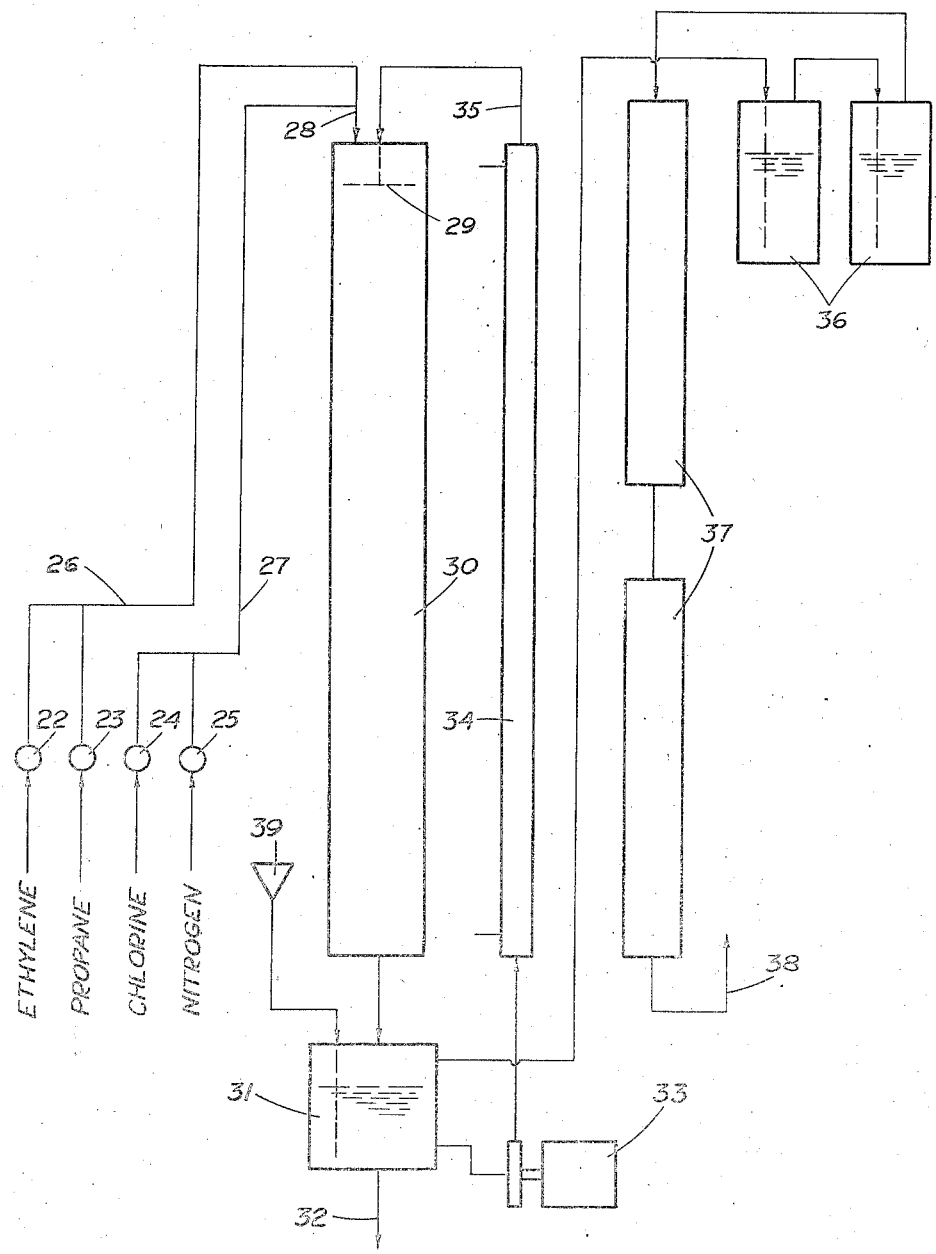

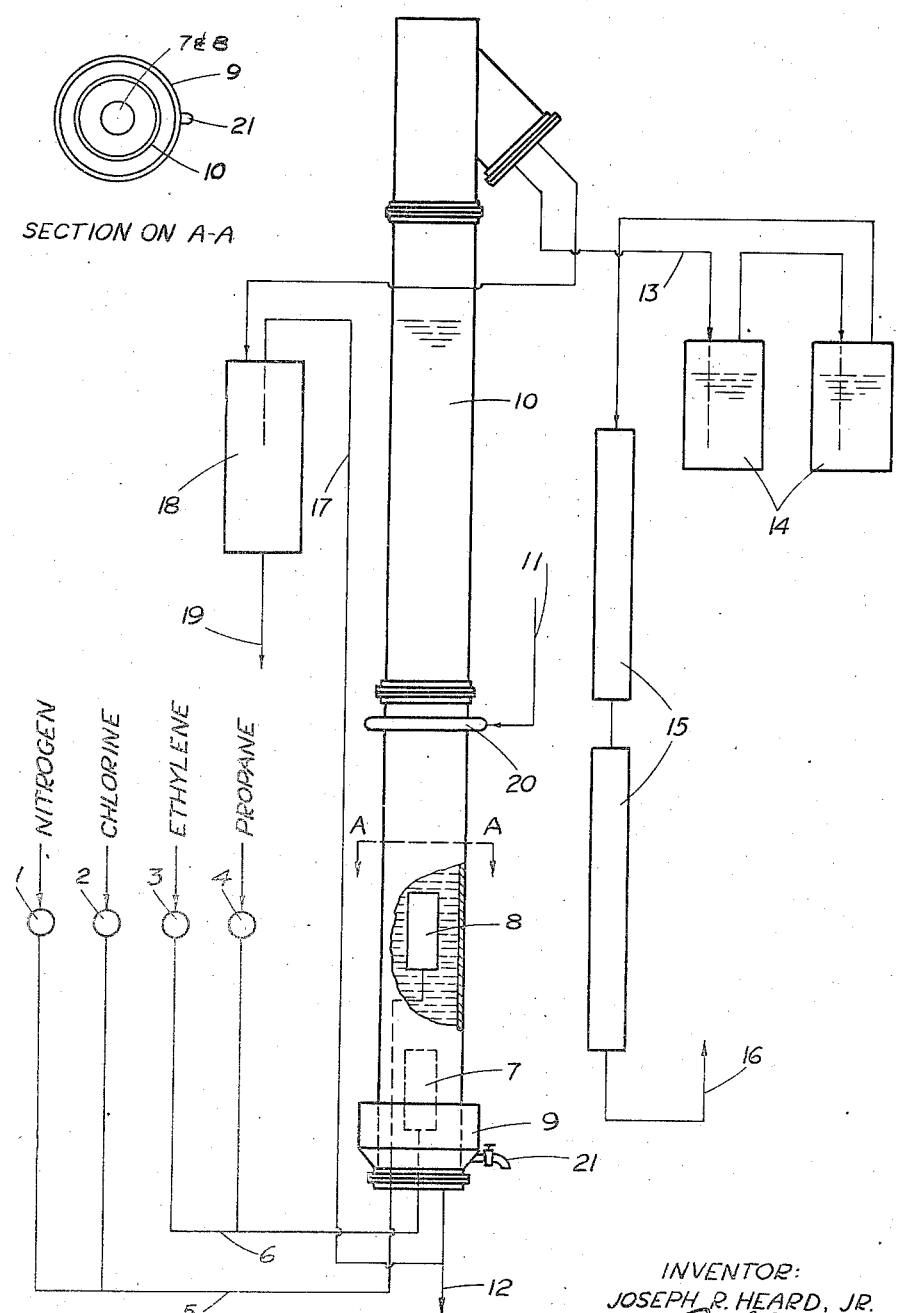

2,403,977

UNITED STATES PATENT OFFICE 2,403,977

DICHLORIDES OF THE ETHYLENE SERIES

Joseph R. Heard, Jr., New York, N. Y., assignor to Wyandotte Chemicals Corporation, Wyandotte, Mich., a corporation of Michigan Application January 8, 1944, Serial No. 517,594

15 Claims. (Cl. 260—660)

This invention relates to the production of olefine dichlorides by treating olefines with chlorine. More particularly this invention relates to forming the dichlorides of the ethylene series, such as ethylene or propylene without forming chlorine substitution products except in traces. Amylene and butylene can be treated, but at the present there is little commercial demand for these dichlorides.

An object of this invention is to react an olefine of the ethylene series with gaseous chlorine in the presence of a nitro-paraffin catalyst dissolved in a co-solvent.

An additional object is to selectively chlorinate, employing this catalyst, a mixture of the ethylene series, such as propylene and ethylene, or butylene, propylene and ethylene, whereby the higher members are chlorinated first. Although the various members of the nitro-paraffin series may be employed as catalysts, the members of the group consisting of nitro-methane, nitro-ethane and nitro-propanes are usually employed. Nitro-ethane is preferred. Any mutual solvent inert to chlorine may be employed. Suitable stable co-solvents are ethylene dichloride, propylene dichloride, trichlorethylene or other chlorinated hydrocarbons essentially inert to chlorine in the presence of olefines and the catalyst. In actual practice the co-solvent for the catalyst and the reactants is of the type formed in the addition reaction. The nitro-paraffins are readily soluble in these dichloride and trichloride solvents.

There have been several processes proposed for the preparation of ethylene dichloride. In one of these, the Brooks et al. U. S. Patent #1,231,123, ethylene is reacted with chlorine in the presence of a mutual solvent: chloroform, carbon tetrachloride, carbon disulfide, tetrachlorethane and dichlorinated ethylene per se. Berliner, who alleges an improvement over this in U. S. Patent #2,022,616 uses a different solvent, to wit a mixture of trichlor- and tetrachlor butane or propane. This yield is 54.1% of the theoretical. No catalyst is present in either of these. Deanesly in U. S. Patent #1,592,122 describes a process whereby addition of oxygen and/or air to the olefine gases serves to inhibit the undesired chlorine-substitution reaction and thereby increase the yield of chlorides formed by the addition of chlorine to olefines. This process has the disadvantage in that the gases are diluted by the addition of air and oxygen, and thus the capacity of equipment is materially reduced. The diluted gases furthermore when they emerge from the equipment are difficult to utilize in further processing of the olefine hydrocarbons. In addition, the incorporation of air and oxygen presents explosion hazards in this process.

Applicant has found that by the employment of nitro-paraffins in catalytic amounts, such as nitro-methane, nitro-ethane or a nitro-propane, in solution while carrying out the reaction between an olefine and chlorine in the presence of a co-solvent, yields surpassing 90% of the dichloride can be secured. When 1.0 to 1.5% of nitro-ethane is employed in the chlorination of ethylene using ethylene dichloride as the co-solvent, the yield of ethylene dichloride is 96%. It is believed that the excellent yields of olefine dichlorides secured by applicant is due to the presence of this type of catalyst in solution in the co-solvent. Applicant does not employ a catalyst bed and since the catalyst is in solution, it is completely and fully operative from the commencement of the chlorine introduction.

The amount of the nitro-paraffin catalyst employed is not critical; only a small amount is required, and a suitable working range is between 0.5 and 1.5% based upon the weight of the co-solvent. The gases should be free of moisture to avoid formation of HCl and chlorhydrins.

Chlorine gas in the pure form or in diluted form such as the diluted gas of low monetary value obtained as "blow off" gas from electrolytic cells or from chlorine liquefaction can be used. Pure ethylene can be used or pure propylene or mixtures of the two gases either alone or in admixture with other gases, such as are simultaneously produced when petroleum oil is cracked.

The preferred temperatures are those of about 30 to 40° C. However, almost any temperature (pressure considered) at which the dichloride is a liquid can be employed. For purpose of designation, at about atmospheric pressure, temperatures of 0 to 70° C. or if operating under 30 lbs. pressure 0 to 100° C. will serve well. However, at 0° C., the reaction is slower and a higher tower will be necessary. At 70° C., although the reaction will be rapid, there will be much volatilization of the ethylene dichloride and the adsorbers will have to be larger.

Pressures are not critica except that the mutual solvent must be kept in the liquid phase. In order to reduce the size of the equipment the preferred pressure is about 50 lbs. gauge per sq. in. However, higher or lower pressures can be used. Pressures lower than 50 lbs. decrease materially the capacity of the equipment in production capacity per hour. At 50 lbs. pressure the output is about triple that at atmospheric pressure.

The process can be carried out either one stage or in a plurality of stages. Stage operations frequently make it easier to control the temperature, i. e. remove the heat of reaction.

It has been found expedient to employ either a liquid filled tower using diffusion cups to bring the gases in small bubbles in contact with the liquid phase. Packed towers can be used to accomplish the same purpose. In the latter the packing should be rather small.

The exit gases from the reaction tower are either passed into contact with such an adsorbent as activated carbon or scrubbed with a heavy non-volatile oil to remove dichloride vapor contained therein, although other modes of recovery could be used. The "activated carbon" if of the type commonly used for the adsorption of gasoline from natural gas, acetone vapors in cellulose acetate spinning or solvent vapors in the lacquer industry. The employment of heavy oil scrubbing is advisable in large scale operations because of the cheapness of operation. After absorption in the oil, the ethylene dichloride is removed and recovered by heating the solvent oil or blowing it with steam to expel it. The recovered ethylene dichloride would then be redistilled for complete purification. The same procedure is followed for the removal and subsequent recovery of propylene dichloride or butylene- or amylene dichlorides.

The chlorinated products can be easily separated by distillation since ethylene dichloride boils at 84° C. and propylene dichloride at 97° C.; nitro-methane boils at 101° C., nitro-ethane at 114° C., 1-nitro-propane boils at 131.6° C., the 2-nitro-propane at 120° C.

In the following description two embodiments of this invention are set forth in detail in conjunction with the accompanying drawings.

Figure I is a diagrammatic view, illustrating apparatus incorporating the present invention wherein a liquid filled tower is employed.

Figure II is a diagrammatic view, illustrating apparatus when a packed tower is employed.

Operation of these types of apparatus in carrying out my invention is set out in the following examples:

Example I

A mixture of ethylene and propane containing propylene was metered continuously through orifices 3 and 4, merging in line 6 and passed through a porous Filtros disperser cup 7 located near the bottom of the tower 10, containing liquid ethylene dichloride carrying the dissolved catalyst. The reaction tower 10 was 120 inches high and had an inside diameter of 1.5 inches. Chlorine and nitrogen were fed simultaneously through orifices 1 and 2 respectively, merged in line 5 leading to a similar disperser cup 8 in the reaction tower. The rate of chlorine fed was maintained about 15% below that of the olefines in the hydrocarbon gases. The tower liquid was maintained at 30° C. by a flow of cooling water through line 11 out through holes in spray 20 down the outside surface of the lower part of the tower 10. A trough 9 was provided for collection and removal of the cooling water through valve 21. Gases from the top of the tower were passed through line 13 to NaOH scrubbers 14 for removal of chlorine and hydrogen chloride. The gases then passed through the carbon adsorber towers 15 or through oil scrubbers (not shown) for removal and recovery of the dichloride vapors. The liquid alkylene dichloride product passed out of the tower continuously through line 17 to the closed receiver 18, the vapor space above the liquid level was pressure equalized to the top of the tower 10. The alkylene dichloride product is withdrawn through line 19 as required then separated from the nitro-paraffin catalyst by distillation. The nitrogen added with the chlorine gas was simply used as a diluent and is not required in the process.

The duration of the run was such that there was an amount of dichloride formed equivalent to that employed in the tower for the solvent at the start of the run.

The following table shows the results secured. For purposes of comparison and of illustrating the high yield of dichlorides in the presence of nitro-ethane as a catalyst, the results are compared with those wherein other oxygen-containing organic compounds were employed under identical conditions.

*Results with nitro-ethane and other organic oxygen-containing compounds*

| Inhibitor catalyst used | None | C₂H₅NO₂ | (C₆H₅CO)₂O₂ | Ascaridole |
|---|---|---|---|---|
| Per cent concentration of catalyst | 0 | 1.5 | 1.0 | 1.0 |
| Cl₂ distribution after the action: | | | | |
| Per cent free Cl₂ in scrubber | 0.0 | 0.5 | 0 | 0 |
| Per cent Cl₂ to HCl | 15.2 | 1.4 | 17.0 | 11.3 |
| Per cent Cl₂ to substitution | 15.2 | 1.4 | 17.0 | 11.3 |
| Per cent Cl₂ dichlorides | 69.6 | 96.7 | 66.0 | 77.4 |
| Average per cent absorption of olefines | 52.0 | 87.9 | 51.4 | 54.8 |

Example II

A glass tower 30 of 2.0 inches inside diameter by 60 inches high is packed with ¼ inch stoneware Raschig rings. A reservoir 31 is connected to the bottom of the tower as an accumulator for the liquid ethylene dichloride solvent (which initially is added through port 39) from which the dichloride, containing the dissolved catalyst is circulated continuously by pump 33 through cooler 34 through pipe line 35 to the top of the tower 30 and sprayed through dispenser 29 over the packing in the tower. Ethylene and commercial propane containing propylene are metered through orifices 22 and 23 respectively, and merged in line 26, entering the top of the tower continuously through a port leading into the solvent spray. Chlorine and nitrogen are similarly continuously metered through orifices 24 and 25 and merged in line 27. The two streams of mixed gases are then mixed in line 28 just prior to entering the tower. The chlorine rate is maintained at about 15% below that of the olefines. The temperature of the dichloride is maintained at 35° C. by recycling through the cooler 34. The exit gases from the reservoir at the bottom of the tower are passed through a NaOH scrubber 36 and carbon adsorbers 37 for removal of chlorine, hydrogen chloride and dichloride vapors, respectively, and finally vented through line 38. The alkylene dichloride product is taken off at the bottom through pipe line 32, then separated by distilling off from the nitroalkane catalyst.

As many apparently widely different embodiments of this invention may be made without departing from the spirit and scope thereof, it is to be understood that I do not limit myself to the specific embodiments except as defined in the appended claims. In the claims the term olefine embraces the diluted gas as well as pure olefine unless otherwise qualified.

I claim:

1. In the process of making dichlorides of the ethylene series, the step of contacting the gaseous olefine with gaseoue chlorine, in the presence of a stable liquid co-solvent for said gases, and in the presence of a small amount of a nitro-paraffin.

2. In the process of making dichlorides of the ethylene series, the step of contacting the gaseous olefine with gaseous chlorine, in the presence of a stable liquid chlorinated hydrocarbon co-solvent for said gases, and in the presence of a small amount of a nitro-ethane.

3. In the process of preparing dichlorides of the ethylene series, the step of contacting the gaseous olefine with gaseous chlorine, in the presence of a stable liquid chlorinated hydrocarbon co-solvent for said gases, and in the presence of a small amount of a nitro-paraffin while maintaining the temperature at about 30–40° C.

4. In the process of preparing dichlorides of the group consisting of ethylene and propylene, the step of contacting the gaseous chlorine with a gaseous member of the group consisting of ethylene and propylene in the presence of a stable liquid chlorinated hydrocarbon co-solvent for the said gases, and in the presence of a small amount of nitro-ethane.

5. In the process of preparing dichlorides of the ethylene series, the step of contacting the gaseous olefine with gaseous chlorine in the presence of a stable liquid chlorinated hydrocarbon co-solvent for the said gases, and in the presence of a small amount of a nitro-paraffin while maintaining a temperature of about 30–40° C. and a pressure of about 50 lbs. per square inch.

6. In the process of preparing dichlorides of the ethylene series, the step of passing gaseous chlorine and gaseous olefine into a tower containing a stable liquid chlorinated hydrocarbon co-solvent for said gases carrying a small amount of dissolved nitro-paraffin.

7. The process set out in claim 6 wherein by-product gases from the tower are scrubbed with an aqueous alkaline hydroxide solution and then passed in contact with a solid adsorber to remove olefine dichloride vapors.

8. In the process of forming dichlorides of the ethylene series, the step of spraying a mixture of gaseous chlorine and a gaseous olefine with a stable liquid dichloride of the ethylene series containing a small amount of a nitro-paraffin dissolved therein.

9. In the process of forming dichlorides of the ethylene series, the steps of passing metered quantities of a gaseous mixture containing ethylene and propylene and metered quantities of gaseous chlorine into liquid dichloride of one of these aforesaid type gases, the rate of the chlorine feed being less than that of the combined olefines, the liquid dichloride containing in solution a small amount of a nitro-paraffin, then drawing off the liquid olefine dichloride, and separating it from the dissolved nitro-paraffin.

10. In the process of forming dichlorides of the ethylene series, the steps of spraying liquid olefine dichloride over an incoming mixture containing gaseous ethylene and propylene and gaseous chlorine, the rate of feed of the chlorine being less than that of the olefines, said liquid olefine dichloride containing a dichloride of one of the incoming gaseous olefines and also containing in solution a small amount of a nitro-paraffin, then drawing off the liquid olefine dichloride and separating it from the dissolved nitroparaffin.

11. The process set out in claim 9 wherein the temperature is about 30–40° C. during the chlorination.

12. The process set out in claim 10 wherein the temperature is 30–40° C. during the chlorination.

13. In the process of forming dichlorides of the ethylene series, the steps of flowing metered quantities of a gaseous olefine and gaseous chlorine concurrent with liquefied olefine dichloride of the ethylene series containing small amounts of a dissolved nitro-paraffin, and then separating the olefine dichloride from the catalyst.

14. In the process of forming dichlorides of the ethylene series, the steps of bringing together metered quantities of gaseous chlorine and a gaseous olefine, the rate of introduction of said chlorine being below that of the olefine, passing the resultant gaseous mixture almost immediately into a packed tower, spraying liquid olefine dichloride containing a small amount of nitro-paraffin over the packing, circulating the liquid olefine dichloride through a cooler to give off heat adsorbed in the reaction and introducing it back into the tower.

15. In the process of forming ethylene dichloride, the steps of bringing together metered quantities of gaseous chlorine and ethylene, the rate of introduction of said chlorine being below that of the ethylene, passing the resultant gaseous mixture almost immediately into a packed tower, spraying liquid ethylene dichloride containing a small amount of nitro-paraffin over the packing, circulating the liquid ethylene dichloride through a cooler to give off heat adsorbed in the reaction and introducing it back into the tower.

JOSEPH R. HEARD, Jr.